US011597984B2

(12) United States Patent
Kaufmann et al.

(10) Patent No.: US 11,597,984 B2
(45) Date of Patent: Mar. 7, 2023

(54) STARTING MATERIAL, USE THEREOF, AND ADDITIVE MANUFACTURING PROCESS USING SAID STARTING MATERIAL

(71) Applicants: AMAG casting GmbH, Braunau am Inn—Ranshofen (AT); AUDI AG, Ingolstadt (DE)

(72) Inventors: Helmut Kaufmann, Braunau (AT); Werner Fragner, Moosbach (AT); Helmut Suppan, Braunau (AT); Adriaan Bernardus Spierings, Wittenbach (CH); Peter J. Uggowitzer, Ottenbach (CH); Andreas Schubert, Bad Friedrichshall (DE); Marc Hummel, Güglingen (DE)

(73) Assignees: AMAG casting GmbH, Braunau am Inn—Ranshofen (AT); AUDI AG, Ingolstadt (DE)

( * ) Notice: Subject to any disclaimer, the term of this patent is extended or adjusted under 35 U.S.C. 154(b) by 224 days.

(21) Appl. No.: 16/603,431

(22) PCT Filed: Apr. 5, 2018

(86) PCT No.: PCT/EP2018/058806
§ 371 (c)(1),
(2) Date: Oct. 7, 2019

(87) PCT Pub. No.: WO2018/185259
PCT Pub. Date: Oct. 11, 2018

(65) Prior Publication Data
US 2020/0149136 A1    May 14, 2020

(30) Foreign Application Priority Data
Apr. 5, 2017 (EP) .................................... 17165133

(51) Int. Cl.
| | |
|---|---|
| C22C 21/08 | (2006.01) |
| B33Y 10/00 | (2015.01) |
| B33Y 70/00 | (2020.01) |
| C22C 21/02 | (2006.01) |
| C22C 21/10 | (2006.01) |

(52) U.S. Cl.
CPC ............. *C22C 21/08* (2013.01); *B33Y 10/00* (2014.12); *B33Y 70/00* (2014.12); *C22C 21/02* (2013.01); *C22C 21/10* (2013.01)

(58) Field of Classification Search
None
See application file for complete search history.

(56) References Cited

U.S. PATENT DOCUMENTS

| | | | | |
|---|---|---|---|---|
| 4,424,084 A | * | 1/1984 | Chisholm ............... | C22C 21/14 148/417 |
| 4,435,213 A | * | 3/1984 | Hildeman ............... | B22F 3/105 148/567 |
| 4,589,932 A | * | 5/1986 | Park .......................... | C22F 1/05 148/417 |
| 4,648,918 A | * | 3/1987 | Asano ..................... | C22C 21/02 148/417 |
| 5,135,713 A | * | 8/1992 | Rioja ....................... | C22C 21/00 148/417 |
| 6,302,973 B1 | * | 10/2001 | Haszler ................. | B32B 15/016 148/437 |
| 2003/0143102 A1 | * | 7/2003 | Matsuoka ............... | C22C 21/08 420/546 |
| 2003/0156968 A1 | | 8/2003 | Hattori et al. | |
| 2003/0190252 A1 | | 10/2003 | Sigworth | |
| 2015/0098859 A1 | * | 4/2015 | Hauck ..................... | C22C 21/02 420/532 |
| 2016/0001403 A1 | * | 1/2016 | Matsumoto ............. | C22C 21/16 219/137 R |
| 2017/0233857 A1 | * | 8/2017 | Lenczowski ............ | C22C 21/12 148/535 |

FOREIGN PATENT DOCUMENTS

| | | |
|---|---|---|
| CN | 103667815 A | 3/2014 |
| CN | 103764858 A | 4/2014 |
| CN | 104342588 A | 2/2015 |
| DE | 102007018123 A1 | 10/2008 |
| EP | 0366134 A1 | 5/1990 |
| JP | 11209839 A | 8/1999 |

OTHER PUBLICATIONS

N.S. Barekar, et al., "Processing of Ultrafine-Size Particulate Metal Matrix Composites by Advanced Shear Technology" Metallurgical and Materials Transactions A, Jan. 17, 2009, pp. 691-701, vol. 40, No. 3, Springer-Verlag, New York, ISSN: 1543-1940, XP019696522.

* cited by examiner

*Primary Examiner* — Seth Dumbris

(57) ABSTRACT

An Al—Mg-based or Al—Mg—Si-based or Al—Zn-based or Al—Si-based starting material in the form of a powder or wire for an additive manufacturing process, the use thereof, and an additive manufacturing process using this starting material are disclosed.

23 Claims, No Drawings

STARTING MATERIAL, USE THEREOF, AND ADDITIVE MANUFACTURING PROCESS USING SAID STARTING MATERIAL

FIELD OF THE INVENTION

The invention relates to an additive manufacturing process and an Al—Mg-based or Al—Mg—Si-based or Al—Zn-based or Al—Si-based starting material in the form of a powder or wire for an additive manufacturing process.

DESCRIPTION OF THE PRIOR ART

In order to increase the mechanical strength of directly generated molded bodies such as components that are manufactured using an additive powder bed-based manufacturing process, the prior art (DE102007018123A1) has disclosed using Al—Mg-based or Al—Mg—Sc-based (AlMg4,6Sc1, 4) powder or wire as a starting material for this additive manufacturing process. Although the grain-refining effect of scandium is known—which grain-refining can also counteract a hot crack formation or warm crack formation in the component—, it is not possible with such powders to ensure a low level of solidification hot crack formation in the component—which problem is also known in laser welding. Known powder bed-based additive manufacturing processes therefore result in a significant processing uncertainty, which at this point, can only be reduced through a suitable alloy selection and narrow process windows. In other words, these circumstances limit the application field of additive manufacturing process.

The same is also known with other starting materials such as Al—Mg—Si-based or Al—Zn-based or Al—Si-based starting materials.

SUMMARY OF THE INVENTION

The object of the invention, therefore, is to provide an Al—Mg-based or Al—Mg—Si-based or Al—Zn-based or Al—Si-based starting material in the form of a powder or wire for an in particular powder bed-based additive manufacturing process, which not only is advantageous in the mechanical properties that can be achieved in the molded body or component, but also can reduce the risk of a hot crack formation.

High mechanical properties such as hardness and a low tendency to hot crack formation can be ensured if the content of manganese (Mn) of at most 0.9 wt % and the content of iron of at most 0.5 wt % of the Al—Mg-based or Al—Mg—Si-based or Al—Zn-based or Al—Si-based starting material fulfills the ordering relation $$(\text{wt \% Mn}) > A + \frac{0.15}{(\text{wt \% Fe})} \text{ where } A =$$
$$2000 * \left(\frac{TLfcc}{575} - 1\right)^4 \text{ and } TLfcc = 660 - 6.6*(\text{wt \% Si}) -$$
$$5.3*(\text{wt \% Mg}) - 3.6*(\text{wt \% Cu}) - 2*(\text{wt \% Zn}).$$

According to the invention, these limits in the composition of the alloy make it possible to ensure that in the structure formation during the in particular powder bed-based additive manufacturing process, the Fe/Mn-containing phase precipitates out before the Al matrix phase of the starting material, making it possible to achieve a finer structure formation. This surprisingly occurs despite the comparatively high content of iron and/or manganese—which high content according to current consensus among experts, forms course intermetallic precipitation phases and thus negatively influences the mechanical properties in the molded body or component.

It has also been possible to determine that while maintaining the ordering relation and taking into account the inherently high cooling speed during the in particular powder bed-based additive manufacturing process, the alloy elements iron and/or manganese can exhibit a particularly high recrystallization-hindering effect on the structure—which can significantly reduce the risk of a solidification hot crack formation and can also significantly reduce pore formation in the molded body or component.

In addition, Fe and/or Mn can also contribute to the increase in strength of the molded body or component and thus further improve the mechanical properties.

By contrast with the prior art, with the starting material according to the invention, it is thus possible to ensure a particularly high level of process reliability in the additive manufacturing process—also permitting versatile use of this process.

The ordering relation can be enhanced if need be by means of the optional alloy elements silicon (Si) and/or magnesium (Mg) and/or copper (Cu) and/or zinc (Zn). In addition, the alloy can optionally contain 0.1 to 2 wt % scandium (Sc) and/or erbium (Er), optionally 0.1 to 3 wt % lithium (Li), optionally 0 to 2 wt % nickel (Ni), and optionally 0 to 1 wt % silver (Ag), beryllium (Be), cobalt (Co), chromium (Cr), hafnium (Hf), molybdenum (Mo), niobium (Nb), titanium (Ti), vanadium (V), zirconium (Zr), tantalum (Ta), or yttrium (Y) alone or in combination.

As the residue, the starting material contains aluminum (Al) and manufacture-dictated inevitable impurities. In general, it should be noted that the starting material can contain impurities, each comprising at most 0.05 wt % and all together comprising at most 0.15 wt %.

The mechanical properties of the molded body or component can be further increased if the starting material contains at least 0.6 wt % Fe. The structure can be further refined while maintaining the ordering relation by using a starting material containing 0.8 to 1.8 wt % Fe and Mn. The structure can also be further refined while maintaining the ordering relation by using a starting material containing 0.8 to 1.2 wt % Fe—which can result in improved mechanical properties of the molded body or component and in a structure with low porosity and a low amount of hot cracking. With the upper limit of in particular up to 1.5 wt % Fe, preferably up to 1.2 wt % Fe, it is possible to limit the total quantity of intermetallic phases in order to be able to ensure a comparatively high ductility of the molded body or component. In this regard, an optimum can be achieved if the starting material contains 1 wt % Fe.

By limiting the sum of the alloy elements Fe and Mn in the composition to 0.7 to 2.1 wt %, it is possible to further improve the refining of the grain structure, which can further increase the mechanical properties. The latter can particularly improve by means of the narrower limits of 0.8 to 1.6 wt % Fe and Mn.

By having the starting material contain 0.05 to 12 wt % Si, 0.1 to 8 wt % Zn, 0.1 to 7 wt % Mg, and 0.05 to 2.5 wt % Cu, it is possible to further optimize the structure with regard to its freedom from pores or hot cracking.

The starting material can be Al—Mg-based in order to enable achievement of a component produced by means of an additive manufacturing process that has excellent corrosion resistance and temperature resistance with regard to mechanical properties such as fatigue strength, creeping, and yield strength. To accomplish this, a content of 2 to 7 wt % Mg is advisable.

If the starting material contains only 3 to 5 wt % Mg, it is possible, for example, to suppress the formation of fume particles produced during the melting process, which reduces the risk of a negative influence on the grain structure. The starting material according to the invention can thus also contribute to increasing the reproducibility of the additive manufacturing process. A further improvement of the hot cracking resistance can be achieved with 0.2 to 2 wt % scandium (Sc) and/or erbium (Er) —in connection with the other limits to the composition, 0.5 to 1.5 wt % Sc and/or Er can particularly excel for this purpose.

The starting material can be Al—Mg—Si-based, with Mg and Si as alloy elements. For this purpose, it can prove valuable for the starting material to contain 0.3 to 2 wt % Mg and 0.05 to 1.5 wt % Si in order to increase mechanical properties and to reduce the susceptibility to hot cracking.

The properties mentioned above can be further improved if the starting material contains 0.3 to 1.2 wt % Mg and 0.5 to 1.2 wt % Si. In addition, due to the comparatively low Mg content, the formation of disadvantageous fume particles that are produced during the melting process can be further suppressed.

To embody a high-strength molded body or component, the starting material can be Al—Zn-based, with 1 to 8 wt % Zn, 1.0 to 3 wt % Mg, and 0.05 to 1.5 wt % Si. Since the limits of the composition according to the invention with regard to Fe/Mn suppress a crack formation particularly well, molded bodies or components manufactured out of such a starting material can especially excel in their tensile strength. The latter can be particularly increased if the starting material contains 4.5 to 8 wt % Zn in order to be able to ensure a high tensile strength of the molded body or component.

In addition to being Al—Si-based, the starting material can also contain 5 to 11 wt % Si in order to reduce the internal stresses and cracking tendency of the molded part or component. Preferably in this regard, the starting material contains 7 to 10 wt % Si.

The starting material according to the invention can be particularly suitable for an additive manufacturing process, in particular in a selective laser melting.

Another object of the invention is to improve the reproducibility of an additive manufacturing process.

Because the starting material according to the invention is used in an additive manufacturing process, it is possible to significantly reduce the risk of solidification hot crack formation and also pore formation in the molded body or component—which can lead to an increased reproducibility in the additive manufacturing process.

The foregoing applies particularly if a molded body or component is produced layer by layer from the starting material by locally melting it with a laser beam.

This can be the case, for example, in a powder bed-based additive manufacturing process such as selective laser melting.

WAYS TO EMBODY THE INVENTION

To prove the achieved effects, molded bodies were manufactured form various powdered starting materials according to Table 1 with the aid of SLM (selective laser melting) as a powder bed-based additive manufacturing process—namely in the form of a cubic die.

TABLE 1

Powder starting materials 1 to 9
Powder starting materials/contents in [wt %]

|   | Basis | Mn | Sc | Zr | Fe | Si | Cu | Zn | Cr |
|---|---|---|---|---|---|---|---|---|---|
| 1 | Al—Mg | 4.7 | 0.54 | 0.01 | 0.45 | 0.06 | | | |
| 2 | Al—Mg | 4.9 | 0.55 | 0.51 | 0.47 | 0.14 | | | |
| 3 | Al—Mg | 4.5 | 0.55 | 0.50 | 0.45 | 0.60 | | | |
| 4 | Al—Si | 0.36 | | | | 0.11 | 10.1 | | |
| 5 | Al—Si | 0.36 | 0.3 | | | 1 | 10.1 | | |
| 6 | Al—Mg—Si | 1.15 | 0.65 | | | 0.22 | 0.75 | 0.35 | 0.2 | 0.1 |
| 7 | Al—Mg—Si | 1.18 | 0.65 | | | 0.95 | 0.79 | 0.38 | 0.2 | 0.1 |
| 8 | Al—Zn | 2.65 | 0.3 | | | 0.11 | 0.1 | 1.6 | 5.8 | 0.22 |
| 9 | Al—Zn | 2.66 | 0.3 | | | 1.1 | 0.1 | 1.6 | 5.9 | 0.23 |

Powder starting materials 1 to 9, in addition to the alloy elements listed in Table 1, contain residual Al and manufacture-dictated inevitable impurities, each comprising at most 0.05 wt % and all together comprising at most 0.15 wt %. The respective upper limit of at most 0.05 wt % also applies to the alloy elements listed in Table 1 whose contents are not indicated.

According to the ordering relation shown in claim 1, for powdered starting materials 1 to 9, the parameters A and TLfcc and the minimum content of Mn are calculated as follows:

TABLE 2

Parameter A, TLfcc, and minimum content of Mn

| Powder starting materials | TLfcc | A | Mn [wt %]> |
|---|---|---|---|
| 1 | 635 | 0.24 | 2.74 |
| 2 | 634 | 0.22 | 1.29 |
| 3 | 636 | 0.26 | 0.51 |
| 4 | 591 | 0.001 | 1.36 |
| 5 | 591 | 0.001 | 0.15 |
| 6 | 647 | 0.494 | 1.18 |
| 7 | 647 | 0.485 | 0.64 |
| 8 | 628 | 0.144 | 1.51 |
| 9 | 628 | 0.141 | 028 |

Al—Mg-Based Starting Material:

According to Table 2, with regard to the Al—Mg-based starting materials 1, 2, and 3, it is clear that only powdered starting material 3, which contains 0.55 wt % Mn, fulfills the ordering relation according to claim 1 because its Mn content is higher than the Mn content stipulated by Table 2.

The individual powdered starting materials 1, 2, and 3 were each completely melted using selective laser melting with an energy density (ED) of 200 J/mm3. An Nd:YAG laser with a laser power of 200 to 400 W, a beam diameter of less than 1 mm, a sampling rate/scanning speed of 250 mm/s, and a powder layer thickness (Δz) of 30 μm were used for this. The molded bodies were each produced layer by layer through local melting of the powdered starting material 1, 2, and 3 according to Table 1 with a grain of approx. 30-45 μm. The scan spacing (also referred to as hatch distance) (Δys) of 135 μm was selected for each layer.

Al—Si-Based Starting Material:

According to the Al—Si-based powdered starting materials 4 and 5 listed in Table 2, only the powdered starting materials 5 that contain 0.3 wt % Mn fulfill the ordering relation according to claim 1 because their Mn content is higher than the Mn content stipulated by Table 2.

The individual powdered starting materials 4 and 5 were each melted with selective laser melting using a Yb:YAG laser with a laser power of 200 W and a sampling rate/scanning speed of 500 mm/s. The molded bodies 4 and 5 were each produced layer by layer through local melting of the powdered starting material according to Table 1 with a grain of approx. 20-45 μm.

Al—Mg—Si-Based Starting Material:

According to Table 2, with regard to the Al—Mg—Si-based starting materials 6 and 7, it is clear that only the powdered starting material 7 that contains 0.65 wt % Mn fulfills the ordering relation according to claim 1 because its Mn content is higher than the Mn content stipulated by Table 2.

The individual powdered starting materials 6 and 7 were each melted with selective laser melting using a Yb:YAG laser with a laser power of 200 W and a sampling rate/scanning speed of 500 mm/s. The molded bodies 6 and 7 were each produced layer by layer through local melting of the powdered starting material according to Table 1 with a grain of approx. 20-45 μm.

Al—Zn-Based Starting Material:

According to Table 2, with regard to the Al—Zn-based starting materials 8 and 9, it is clear that only the powdered starting material 9 that contains 0.3 wt % Mn fulfills the ordering relation according to claim 1 because its Mn content is higher than the Mn content stipulated by Table 2.

The individual powdered starting materials 8 and 9 were each melted with selective laser melting using a Yb:YAG laser with a laser power of 200 W and a sampling rate/scanning speed of 500 mm/s. The molded bodies 8 and 9 were each produced layer by layer through local melting of the powdered starting material according to Table 1 with a grain of approx. 20-45 μm.

The powdered starting materials 3, 5, 7, and 9 therefore constitute embodiments according to the invention.

The properties of the molded bodies thus achieved are listed in Table 2 below.

TABLE 3

Characteristic values of molded bodies manufactured from the powdered starting materials

| Molded bodies made of powdered starting material | Hardness HV3 | Rm [MPa] | A [%] | Porosity [%] | Hot cracks |
|---|---|---|---|---|---|
| 1 | 73 | 270 | 9.0 | >4 | >400 μm |
| 2 | 74 | 274 | 10.5 | >3.5 | >200 μm |
| 3 | 105 | 370 | 19.5 | <2 | <30 μm |
| 4 | 116 | 430 | 7 | >0.5 | >50 μm |
| 5 | 130 | 480 | 14 | <0.5 | <30 μm |
| 6 | 108 | 315 | 17.5 | >3 | >350 μm |
| 7 | 116 | 340 | 23.5 | <1.5 | <100 μm |
| 8 | 173 | 570 | 9.5 | >4.5 | >500 μm |
| 9 | 181 | 595 | 11.5 | <3 | <180 μm |

According to the invention Table 3, the molded bodies made of the powdered starting materials 1 and 2 had a significantly lower hardness compared to the molded body made of the powdered starting material 3 according to the invention—which is also reflected in a reduced tensile strength Rm and reduced ultimate elongation A. It was also possible to prove that molded bodies made of powdered starting material 3 can be manufactured by means of the selective laser melting method without hot cracking. These molded bodies also exhibited a lower porosity.

The porosity of the molded bodies was determined according to Archimedes' principle (hydrostatic scale).

A comparable result can also be observed with regard to the molded bodies made of the powdered starting materials 4 and 5; the powdered starting materials 7 and 8; and the powdered starting materials 8 and 9. Here, too, the same improved characteristic values of the molded body made of the powdered starting material 5, 8, and 9, respectively, with regard to tensile strength Rm, ultimate elongation A, freedom from hot cracking, and porosity.

Suitable lasers for the additive manufacturing process, depending on the radiation-absorbing properties of the powder used, also include CO2 lasers, diode lasers, etc. In general, it should be noted that "in particular" is to be understood as an example.

The invention claimed is:

1. An Al—Mg-based starting material in the form of a powder or wire for an additive manufacturing process, consisting of:
   from 0.6 to 1.5 wt % iron (Fe),
   at most 0.9 wt % manganese (Mn),
   2 to 7 wt % magnesium (Mg), and
   optionally 0.05 to 2.5 wt % copper (Cu), optionally 0.05 to 12 wt % silicon (Si), and optionally 0.1 to 8 wt % zinc (Zn);
   wherein the content of manganese (Mn) and iron (Fe) together is from 0.7 to 2.1 wt % and fulfills an ordering relation $$(\text{wt \% Mn}) > A + \frac{0.15}{(wt \text{ \% Fe})}$$

with $$A = 2000 * \left(\frac{TLfcc}{575} - 1\right)^4$$

$TLfcc = 660 - 6.6 * (\text{wt \% Si}) -$
$\qquad 5.3 * (\text{wt \% Mg}) - 3.6 * (\text{wt \% Cu}) - 2 * (\text{wt \% Zn})$, and optionally having
0.1 to 2 wt % erbium (Er),
0.1 to 3 wt % lithium (Li),
0 to 2 wt % nickel (Ni), 0 to 1 wt % silver (Ag), beryllium (Be), cobalt (Co), chromium (Cr), hafnium (Hf), molybdenum (Mo), niobium (Nb), titanium (Ti), vanadium (V), zirconium (Zr), tantalum (Ta), yttrium (Y) individually or in a combination; and residual aluminum (Al) and inevitable manufacturing induced impurities each having a maximum of 0.05% by weight and a total of at most 0.15% by weight.

2. The starting material according to claim 1, wherein the starting material has from 0.8 to 1.2 wt % Fe.

3. The starting material according to claim 1, wherein the starting material contains
3 to 5 wt % Mg and
0.2 to 2 wt % Er.

4. An additive manufacturing process comprising using the starting material according to claim 1.

5. The additive manufacturing process according to claim 4, comprising producing a molded body or component layer by layer from the starting material by locally melting the starting material with a laser beam.

6. The additive manufacturing process according to claim 4, comprising using selective laser melting.

7. An Al—Mg—Si-based starting material in the form of a powder or wire for an additive manufacturing process, consisting of:
from 0.6 to 1.5 wt % iron (Fe),
at most 0.9 wt % manganese (Mn),
0.3 to 2 wt % magnesium (Mg), and
0.05 to 1.5 wt % silicon (Si),
optionally 0.05 to 2.5 wt % copper (Cu), optionally 0.1 to 8 wt % zinc (Zn);
wherein the content of manganese (Mn) and iron (Fe) together is from 0.7 to 2.1 wt % and fulfills an ordering relation $$(wt\ \%\ \text{Mn}) > A + \frac{0.15}{(wt\ \%\ \text{Fe})}$$

with $$A = 2000 * \left(\frac{TLfcc}{575} - 1\right)^4$$

$$TLfcc = 660 - 6.6*(wt\ \%\ \text{Si}) - 5.3*(wt\ \%\ \text{Mg}) - 3.6*(wt\ \%\ \text{Cu}) - 2*(wt\ \%\ \text{Zn}),$$

and optionally having
0.1 to 2 wt % erbium (Er),
0.1 to 3 wt % lithium (Li),
0 to 2 wt % nickel (Ni),
0 to 1 wt % silver (Ag), beryllium (Be), cobalt (Co), chromium (Cr), hafnium (Hf), molybdenum (Mo), niobium (Nb), titanium (Ti), vanadium (V), zirconium (Zr), tantalum (Ta), yttrium (Y) individually or in a combination; and residual aluminum (Al) and inevitable manufacturing induced impurities each having a maximum of 0.05% by weight and a total of at most 0.15% by weight.

8. The starting material according to claim 7, wherein the starting material contains
0.3 to 1.2 wt % Mg and
0.5 to 1.2 wt % Si.

9. The starting material according to claim 7, wherein the starting material has from 0.8 to 1.2 wt % Fe.

10. An Al—Zn-based starting material in the form of a powder or wire for an additive manufacturing process, consisting of:
from 0.6 to 1.5 wt % iron (Fe),
at most 0.9 wt % manganese (Mn),
1 to 8 wt % zinc (Zn),
1.0 to 3 wt % magnesium (Mg), and
0.05 to 1.5 wt % silicon (Si),
optionally 0.05 to 2.5 wt % copper (Cu);
wherein the content of manganese (Mn) and iron (Fe) together is from 0.7 to 2.1 wt % and fulfills an ordering relation $$(wt\ \%\ \text{Mn}) > A + \frac{0.15}{(wt\ \%\ \text{Fe})}$$

with $$A = 2000 * \left(\frac{TLfcc}{575} - 1\right)^4$$

$$TLfcc = 660 - 6.6*(wt\ \%\ \text{Si}) - 5.3*(wt\ \%\ \text{Mg}) - 3.6*(wt\ \%\ \text{Cu}) - 2*(wt\ \%\ \text{Zn}),$$

and optionally having
0.1 to 2 wt % erbium (Er),
0.1 to 3 wt % lithium (Li),
0 to 2 wt % nickel (Ni),
0 to 1 wt % silver (Ag), beryllium (Be), cobalt (Co), chromium (Cr), hafnium (Hf), molybdenum (Mo), niobium (Nb), titanium (Ti), vanadium (V), zirconium (Zr), tantalum (Ta), yttrium (Y) individually or in a combination; and residual aluminum (Al) and inevitable manufacturing induced impurities each having a maximum of 0.05% by weight and a total of at most 0.15% by weight.

11. The starting material according to claim 10, wherein the starting material contains 4.5 to 8 wt % Zn.

12. The starting material according to claim 10, wherein the starting material has from 0.8 to 1.2 wt % Fe.

13. An Al—Si-based starting material in the form of a powder or wire for an additive manufacturing process, consisting of:
from 0.6 to 1.5 wt % iron (Fe),
at most 0.9 wt % manganese (Mn),
5 to 11 wt % silicon (Si),
optionally 0.1 to 8 wt % zinc (Zn), optionally 0.1 to 7 wt % magnesium (Mg), and optionally 0.05 to 2.5 wt % copper (Cu);
wherein the content of manganese (Mn) and iron (Fe) fulfills an ordering relation $$(wt\ \%\ \text{Mn}) > A + \frac{0.15}{(wt\ \%\ \text{Fe})}$$

with $$A = 2000 * \left(\frac{TLfcc}{575} - 1\right)^4$$

$$TLfcc = 660 - 6.6*(wt\ \%\ \text{Si}) - 5.3*(wt\ \%\ \text{Mg}) - 3.6*(wt\ \%\ \text{Cu}) - 2*(wt\ \%\ \text{Zn}),$$

and optionally having
0.1 to 2 wt % erbium (Er),
0.1 to 3 wt % lithium (Li), 0 to 2 wt % nickel (Ni), 0 to 1 wt % silver (Ag), beryllium (Be), cobalt (Co), chromium (Cr), hafnium (Hf), molybdenum (Mo), niobium (Nb), titanium (Ti), vanadium (V), zirconium (Zr), tantalum (Ta), yttrium (Y) individually or in a combination; and residual aluminum (Al) and inevitable manufacturing induced impurities each having a maximum of 0.05% by weight and a total of at most 0.15% by weight.

14. The starting material according to claim 13, wherein the starting material has from 0.8 to 1.2 wt % Fe.

15. An additive manufacturing process comprising using the starting material according to claim 7.

16. An additive manufacturing process comprising using the starting material according to claim 10.

17. An additive manufacturing process comprising using the starting material according to claim 13.

18. The additive manufacturing process according to claim 15, comprising producing a molded body or component layer by layer from the starting material by locally melting the starting material with a laser beam.

19. The additive manufacturing process according to claim 15, comprising using selective laser melting.

20. The additive manufacturing process according to claim 16, comprising producing a molded body or component layer by layer from the starting material by locally melting the starting material with a laser beam.

21. The additive manufacturing process according to claim 16, comprising using selective laser melting.

22. The additive manufacturing process according to claim 17, comprising producing a molded body or component layer by layer from the starting material by locally melting the starting material with a laser beam.

23. The additive manufacturing process according to claim 17, comprising using selective laser melting.

* * * * *

UNITED STATES PATENT AND TRADEMARK OFFICE
CERTIFICATE OF CORRECTION

PATENT NO. : 11,597,984 B2
APPLICATION NO. : 16/603431
DATED : March 7, 2023
INVENTOR(S) : Helmut Kaufmann et al.

It is certified that error appears in the above-identified patent and that said Letters Patent is hereby corrected as shown below:

In the Specification

Column 4, Line 21, --Mg-- should be inserted between "Basis" and "Mn".

Column 4, Line 58, "028" should read --0.28--.

Signed and Sealed this
Third Day of October, 2023

Katherine Kelly Vidal
Director of the United States Patent and Trademark Office